March 23, 1954   I. M. TERWILLIGER   2,672,799
LIGHT GATE IRIS
Filed Oct. 18, 1946   2 Sheets-Sheet 1
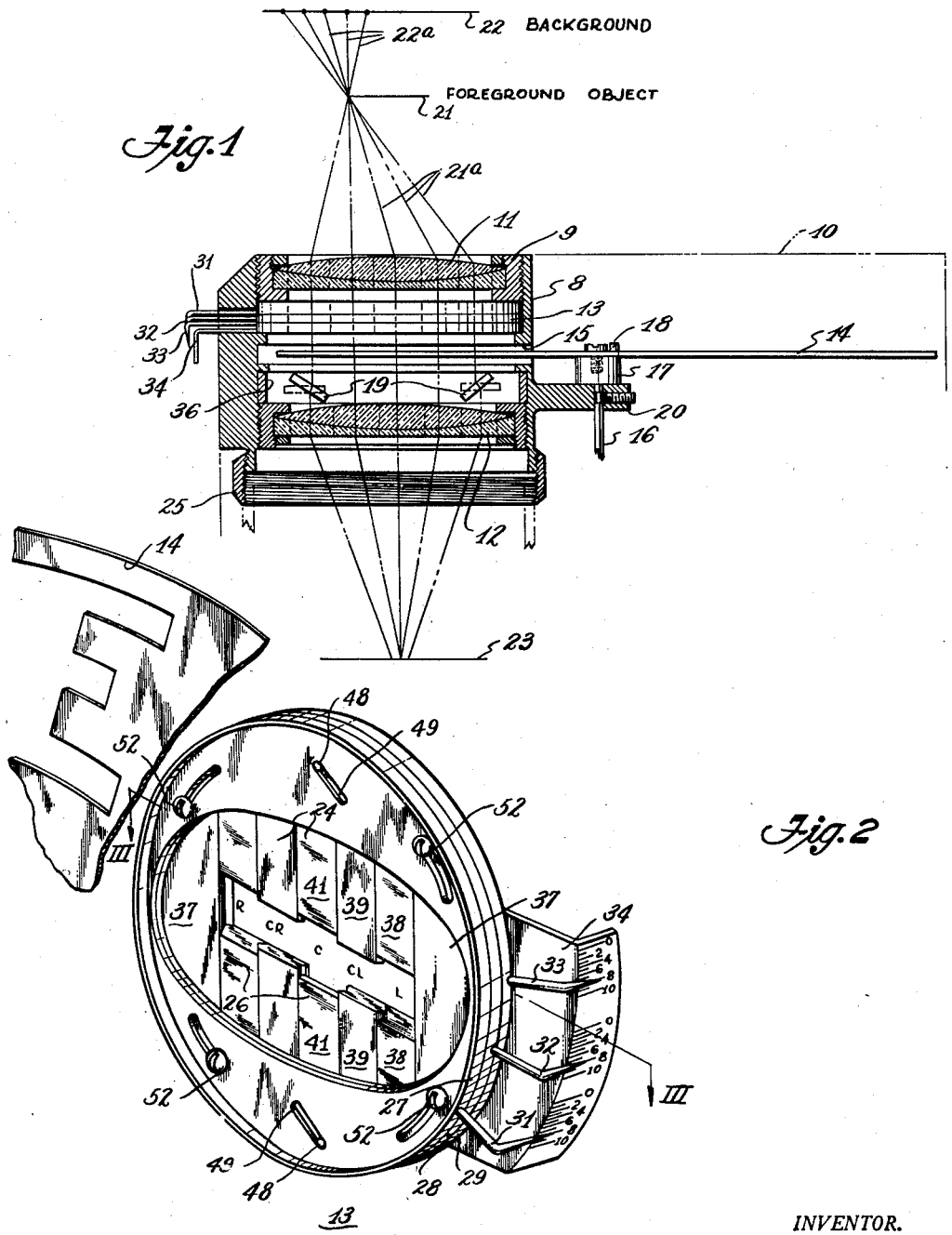
INVENTOR.
IVAN MELVILLE TERWILLIGER
BY
ATTORNEY March 23, 1954 — I. M. TERWILLIGER — 2,672,799
LIGHT GATE IRIS
Filed Oct. 18, 1946 — 2 Sheets-Sheet 2
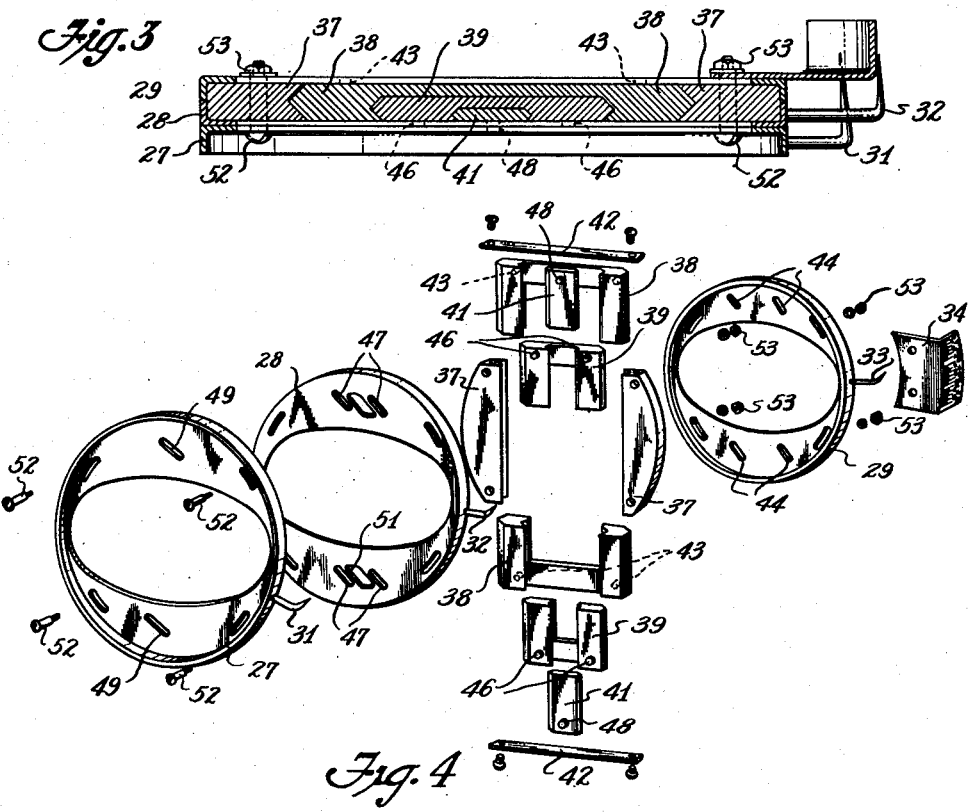
INVENTOR.
IVAN MELVILLE TERWILLIGER
BY Harold W. Mattingly
ATTORNEY Patented Mar. 23, 1954

2,672,799

UNITED STATES PATENT OFFICE 2,672,799

LIGHT GATE IRIS

Ivan Melville Terwilliger, Santa Monica, Calif.

Application October 18, 1946, Serial No. 704,118

3 Claims. (Cl. 95—64)

My invention relates to the production of optical images, and has particular reference to apparatus by which optical images of scenes having depth appear to have roundness of form, clarity of focus, and depth of shape. The images thus produced are particularly useful in motion pictures, television, and other systems using changing or successive images, although the invention is applicable to still photography. My invention constitutes an improvement in the structure disclosed in my copending application, Serial No. 494,419, filed July 12, 1943, now Patent 2,424,592.

The result is an improved image having a semblance of reality. My invention includes a system of light gates at the iris position disposed contiguously at local stations and synchronized for adjustment according to symmetrical groups.

It is therefore a general object of my invention to provide improved optical images.

Another object of my invention is to provide an improved iris, stop, or light gate for a lens system producing superimposed images taken from horizontally related view points.

Other objects and advantages of my invention will be apparent in the following description and claims, considered together with the accompanying drawings, in which:

Fig. 1 is a diagrammatic showing of a lens, light gate, light modulator, and refractors embodying my invention, together with a diagram of light rays passing therethrough from a scene having foreground and background objects;

Fig. 2 is a perspective view of the light gate assembly embodying my invention, together with a fragmentary showing of a light modulator for use therewith;

Fig. 3 is a sectional view taken along the line III—III of Fig. 2;

Fig. 4 is an exploded perspective view of the light gate assembly of Fig. 2.

Referring to Fig. 1, there is illustrated apparatus embodying my invention as applied to the production of optical images from a scene having several planes of depth; that is, the objects forming parts of the scene are at different distances from the lens. As stated previously, the invention is useful in television and other arts, but will be described with reference particularly to motion picture photography. A motion picture camera is accordingly represented generally by a broken outline designated by the figure 10. Disposed within the camera 10 is a lens assembly which may be mounted in a frame 8 by means of threaded annuli 9, and may include a front lens element 11 spaced from a rear lens element 12. Held within the generally tubular frame 8 by the front lens annulus 9 is an assembly 13 of adjustable light gates, which assembly is disposed between the two lens elements. The entire tubular assembly 8 is slotted at 15 to define a region in which a rotatable disk 14 may be disposed. The disk 14 is removably mounted on a rotatable shaft 16 terminating in a head 17 in which is positioned a registration pin 18. The shaft 16 may be held in spaced relation to the tubular frame member 18 by means of a supporting arm 20 through which the shaft 16 passes. Disposed also between the two lens elements and disposed on respective side portions thereof are two refractors 19 within a frame 36.

The scene to be photographed may include a foreground object 21 and a background object 22. My realistic depth effect includes not only an element of stereoscopic view, that is, the ability to peer around an object, but also includes an element of parallax, that is, the apparent displacement of a foreground object against a background object when viewed from different positions. The rays emanating from the background and passing the edge or contour of the foreground object are shown and designated 22a, and the rays emanating from the foreground object 21 are also shown and designated as 21a, since these will be the most illustrative parts of the light received with respect to the operation of my invention. These rays of light coincide at the foreground object 21 and are received by the lens assembly and are focused upon a plane in which is disposed a photographic film strip 23. The principal focus of the lens may be obtained in any well-known manner, such as manually rotating a threaded ring nut 25. Inasmuch as the light modulator 14 partially regulates light impinging upon the film 23, the advancement of the film and the rotation of the light modulator 14 are synchronized in any suitable well-known manner, although this synchronizing structure is not shown.

The apertures in the light gate 13 are formed along a horizontal line so as to obtain spaced related views of a single scene, that is, view points displaced horizontally. Any suitable number of horizontally aligned apertures may be used, but I have found that five is a satisfactory number. Accordingly the adjustable light gate 13 is divided into five aperture portions or view points; namely, L, CL, C, CR and R, meaning, respectively, left, center left, center, center right, and right. The lens elements 11 and 12 are indicated as having five parts, each to indicate that any suitable lens element may be employed.

One embodiment of my adjustable light gate 13 (Fig. 1) is shown in assembled condition in Fig. 2, together with a fragmentary showing of a portion of the light modulator 14. In connection with the aperture portions formed in the light gate 13, I have found that best blended modulation effects are obtained when the outermost apertures have a similar size and when the two intermediate apertures also have a similar size. Accordingly I provide a mechanism for obtaining simultaneous adjustment of the outer apertures as a pair, and independent of the adjustment of the intermediate apertures as a pair, which intermediate apertures are also adjustable as a pair. The center aperture is independently adjustable. I prefer to form my apertures by using vertically movable members so that two portions may be moved up and down with respect to a centerline to define the size of a given aperture. Accordingly therefore, with reference to Fig. 2, I provide a plurality of vertically movable elements 24 in the top part of my adjustable light gate, and a plurality of vertically movable elements 26 in the bottom part of my light gate 13. These elements are moved by rotatable plates 29, 28 and 27, which rotatable plates move in turn the outermost elements 24 and 26, forming the left and right apertures, the intermediate elements 24 and 26 forming the center left and center right apertures, and the center elements 24 and 26 defining the center aperture. These plates 27, 28 and 29 may be rotated by the manual movement of radially projecting rods 31, 32 and 33, respectively, terminating in bent pointed indicators rotatable against scales on a scale member 34.

The construction of the adjustable light gate 13 is shown in more detail with reference to Figs. 2, 3 and 4. The rotatable plates 27, 28 and 29 are circumferentially flanged and the flanges on plates 27, 28 and 29 adjoin each other to enclose two frame members 37. Disposed for vertical movement within the frame members 37 are two U-shaped members 38 having chamfered edges to fit within the V-shaped grooves within the frame members 37. The cross member of the U-shaped members 38 is of less thickness than the upright stems of the members 38 to permit the insertion within each member 38 of a smaller U-shaped member 39, also having chamfered edges to fit within V-shaped grooves in the members 38. A single elongated member 41 is placed within each U-shaped member 39, and also has chamfered edges for fitting within the vertically aligned grooves in the U-shaped members 39. The entire assembly of frames 37 and the U-shaped members 38 and 39 and the single elements 41 is held together by end strips 42 screwed to the top and bottom of the frames 37.

The rotatable plates 27, 28 and 29 cause independent movement of the parts 41, 39 and 38 respectively by means of pins projecting from the sliding members through cam slots in the plate members. Accordingly the U-shaped members 38 are each provided with two pins 43 that project through slots 44 in the plate 29. The inner U-shaped members 39 are equipped with oppositely projecting pins 46 which project oppositely from the pins 43 and which pass through slots 47 in the plate 28. The straight elements 41 are equipped with pins 48 that project through slots 49 in the plate 27. In this connection it is noted that the plate 28 is provided with enlarged apertures 51, each of which permits one of the pins 48 to pass therethrough without coming in engagement with the rotatable plate 28. The plates are assembled to each other and to the frames 37 by means of through-bolts 52 to which are threaded nuts 53. The two right hand bolts 52 (Fig. 4) also pass through the scale member 34 to secure it to the assembly.

From the foregoing description of the light gate 13 it will be apparent that the aperture portions R, CR, C, CL and L may be opened or closed by proper movement of the plates 27, 28 and 29, and that the apertures R and L are opened equal amounts, and that the apertures CR and CL are opened equal amounts for any one setting. In this connection it will be noted that the scale member 34 contains graduations for the rotation of each plate 27, 28 and 29 through a total of ten aperture units; that is, the corresponding apertures may be completely closed or may be opened up to a total of ten aperture units. Whereas the total number of aperture units has been mentioned as ten, this number is illustrative only. Actually, any reasonable multiplicity of five graduations may be employed on the scale. Moreover, it will be noted that the centers of all apertures are along a horizontal line.

It will be appreciated that my invention may be applied to television and to other apparatus for producing optical images.

Accordingly I do not limit myself to motion picture photography or still photography, or limit myself in any other way, except by the terms of the following claims.

I claim:

1. In image forming equipment, means forming an adjustable light gate for modifying light from different view points, said means including two groups of light intercepting elements disposed symmetrically above and below a horizontal axis, the elements of each group being adjustable in a vertical direction toward and away from said axis and being formed to control light over adjacent vertically extending areas, and mechanical means for adjusting said elements, said mechanical means including means for connecting certain of said elements in pairs for conjoint vertical adjustment, the elements of each pair being symmetrically disposed on opposite sides of a vertical axis, the vertically aligned elements of the pairs of each group being interconnected for conjoint adjustment toward and away from said horizontal axis.

2. Image forming apparatus comprising a lens element providing at least five light transmitting areas, a frame disposed adjacent said lens element and perpendicularly with respect to the optical axis thereof, a first pair of U-shaped elements movable in said frame and disposed with their tips toward each other and symmetrically about said optical axis, a second pair of U-shaped elements movable in said first U-shaped elements and disposed with their tips toward each other and symmetrically about said axis, a third pair of elements movable in said second U-shaped elements and disposed with their inner ends toward each other and symmetrically about said axis, each of said elements being movable in a plane perpendicular to said axis, a pin projecting from each of said movable elements substantially perpendicularly with respect to the plane of movement thereof, rotatable discs disposed in planes perpendicular to said axis and having pairs of opposed nonconcentric slots within which said pins are engaged, all of the pins carried by each of said pairs of elements being engaged within the slots of a single one of said discs, corresponding portions of the two slots of each of said pairs of slots being parallel to each other whereby rotation of a disc effects movement of the two elements of the associated pair of elements in opposite directions, and calibrations for determining the amount of rotation of each of said discs necessary to attain adjustment of the elements of the associated pair to predetermined position.

3. Image forming equipment comprising a lens structure having at least five aligned light transmitting areas, adjustable means associated with each of said areas and defining an aperture therefor, means interconnecting the two of said defining means associated with the two outermost ones of said areas for coextensive adjustment, independent means interconnecting the two of said defining means associated with intermediate ones of said areas for coextensive adjustment, and independent means for adjusting said defining means associated with the central one of said areas, said defining means being arranged in opposed pairs and the defining means of each pair being interconnected to define the associated aperture symmetrically on opposite sides of a line intersecting the optical axis of said lens structure.

IVAN M. TERWILLIGER.

References Cited in the file of this patent

UNITED STATES PATENTS

| Number | Name | Date |
|---|---|---|
| 532,326 | Levy | Jan. 8, 1895 |
| 755,235 | O'Donnell et al. | Mar. 22, 1904 |
| 947,490 | Gwozdz | Jan. 25, 1910 |
| 958,367 | Clawson | May 17, 1910 |
| 1,034,943 | Wohlaner | Aug. 6, 1912 |
| 1,171,548 | Shiland | Feb. 15, 1916 |
| 1,356,343 | Davis et al. | Oct. 19, 1920 |
| 1,368,608 | Curran | Feb. 15, 1921 |
| 1,471,031 | Johnson | Oct. 16, 1923 |
| 1,603,340 | Hubbell | Oct. 19, 1926 |
| 1,912,700 | Fritts | June 6, 1933 |
| 1,944,230 | Gregory | Jan. 23, 1934 |
| 2,011,002 | Leitz, Jr. | Aug. 13, 1935 |
| 2,094,214 | Heymer | Sept. 28, 1937 |
| 2,135,506 | Hansch et al. | Nov. 8, 1938 |
| 2,160,716 | Blondel | May 30, 1939 |
| 2,322,752 | Terwilliger | June 29, 1943 |
| 2,331,941 | Terwilliger | Oct. 19, 1943 |
| 2,356,178 | Poynter | Aug. 22, 1944 |
| 2,375,962 | Terwilliger | May 15, 1945 |
| 2,424,592 | Terwilliger | July 29, 1947 |

FOREIGN PATENTS

| Number | Country | Date |
|---|---|---|
| 4,914 | Great Britain | of 1907 |

OTHER REFERENCES

J. S. Mertle: Article in American Photo-Engraver, on "Half Tone Stops," vol. 21, No. 10, 1929, pages 937–951. Photostatic copy in Division 7.